United States Patent [19]
Wilkinson

[11] 4,236,105
[45] Nov. 25, 1980

[54] DIGITAL CENTER TRACKING SYSTEM

[75] Inventor: Richard L. Wilkinson, Torrance, Calif.

[73] Assignee: MCA Discovision, Inc., Universal City, Calif.

[21] Appl. No.: 3,019

[22] Filed: Jan. 12, 1979

[51] Int. Cl.³ .............................................. G05B 19/33
[52] U.S. Cl. ....................................318/577; 318/576; 318/640; 360/77; 250/202
[58] Field of Search ....................... 318/576, 577, 640; 250/202; 360/77; 358/128; 179/100.3 D, 100.3 V

[56] References Cited

U.S. PATENT DOCUMENTS

| | | | |
|---|---|---|---|
| 3,994,016 | 11/1976 | Moghadam | 360/77 |
| 4,037,252 | 7/1977 | Janssen | 250/202 |
| 4,063,287 | 12/1977 | Van Rosmalen | 250/202 |
| 4,138,741 | 2/1979 | Hedlund et al. | 360/77 |
| 4,160,270 | 7/1979 | Goldschmidt et al. | 358/128 |

*Primary Examiner*—Gene Z. Rubinson
*Assistant Examiner*—Eugene S. Indyk
*Attorney, Agent, or Firm*—Ronald J. Clark

[57] ABSTRACT

A digital servo system for maintaining a detection device, such as a light beam, centered as closely as possible over an information track, such as an optical track on a video recording disc. The servo system includes circuitry for detecting when the light beam traverses a switching line, which, in the illustrative embodiment, is the track centerline, for applying a constant-magnitude acceleration force to deflect the beam to a corrected position, and for reversing the polarity of the acceleration force when the beam traverses the switching line.

8 Claims, 6 Drawing Figures

DIGITAL CENTER TRACKING SYSTEM

BACKGROUND OF THE INVENTION

This invention relates generally to systems for the reproduction of recorded information, such as video information recorded on a disc, and, more particularly, to systems for maintaining a light beam essentially centered on an information track on such a disc.

Video and other types of information can be stored on a disc as a succession of light-reflective and non-reflective regions along a spiral information track on the surface of a disc-shaped record carrier. In reproducing the video information, a video disc player employs an optical system for directing a radiant reading beam, such as a laser beam, onto the information track, and for detecting a reflected beam indicative of the reflectivity of the disc surface scanned by the laser beam as the disc is rotated. In a disc player of the type with which the invention may be usefully employed, the intensity of the reflected beam takes the form of a high-frequency carrier signal which is frequency modulated by the video information.

In order to store a reasonably large amount of information on the disc, successive turns of the information track must be so closely spaced that even a slight degree of disc eccentricity would cause the beam to traverse a number of adjacent tracks on each revolution. Consequently, some means must be provided for applying transverse or radial corrections to the beam position, so that it substantially follows along the center of the information track.

One solution to this problem is to provide an analog servo system in which an error signal is derived, and a corresponding correction signal is applied to position the beam as closely as possible to the center of the track. Unless such a system employs a non-central null position, some means must also be provided for distinguishing between excursions to one side of the track from those to the other side, since the signal response is essentially symmetrical about the track centerline. Furthermore, analog servo control systems employ relatively complex components requiring critical circuit adjustments, and the component characteristics may vary significantly over a period of time. Accordingly, there is a definite need for a center tracking technique of simple design, which may be adjusted to provide accurate tracking with a minimal excursion from the centerline of the track. It is therefore an object of this invention to provide a digital tracking system that satisfies this need.

SUMMARY OF THE INVENTION

The present invention resides in a digital center tracking system, and a method for its use, for following an information track by means of a digital logic signal, instead of an analog signal, to control the position of a detection means. Basically, and in general terms, the apparatus of the invention comprises first transducer means for moving the detection means transversely with respect to the information track, second transducer means for deriving an information signal from the detection means, and means for low-pass filtering the information signal to derive an error signal indicative of the position of the detection means with respect to the track center. The apparatus further includes means for processing the error signal to derive a timing signal indicative of the times at which the position of the detection means corresponds with the position of a switching line located at a preselected distance from the track center, and means responsive to the timing signal, for controlling the polarity and duration of an acceleration signal applied to the first transducer means, to accelerate the detection means toward a corrected position. In effect, then, the apparatus of the invention operates to switch the direction or polarity of an acceleration signal in accordance with the detected position of the detection means with respect to the track center.

More specifically, in the illustrative embodiment of the invention, the timing signal derived from the error signal contains information with respect to the times at which the detection means crosses the track centerline, i.e., the switching line is located precisely at the track center. Upon detection of the track center position, the acceleration signal is reversed in polarity. Thus, the detection means, which in the preferred embodiment includes a light beam, swings from side to side through the centerline and always has a constant accelerating force applied to it tending to accelerate it back toward the centerline.

In the illustrative embodiment, the means for processing the error signal includes an integrator circuit and a limiter circuit to provide a square-wave timing signal, and a divide-by-two circuit to provide a signal for amplification and transmission to the transducer.

It will be appreciated from the foregoing that the present invention represents a significant advance in the field of video reproduction systems, as well as in data retrieval systems in general. In particular, the invention provides a simple and reliable technique for ensuring that the detection means used to read video information accurately follows the center of the information track. Other aspects and advantages of the present invention will become apparent from the following more detailed description, taken in conjunction with the accompanying drawings.

BRIEF DESCRIPTION OF THE DRAWINGS

FIG. 3b is a graph showing the integrated error signal of FIG. 3a;

DESCRIPTION OF THE PREFERRED EMBODIMENT

Figure 1:
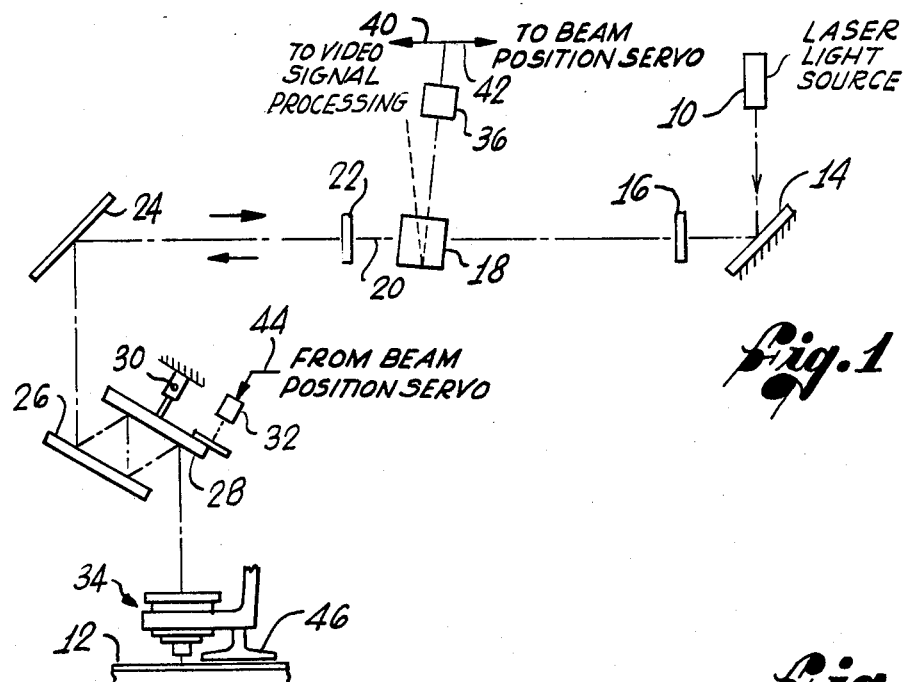
FIG. 1 is a simplified diagrammatical view of an optical playback system for video disc recordings.

As shown in the drawings for purposes of illustration, the present invention is concerned with a digital servo control system for maintaining a beam as nearly as possible in alignment with the center of an information track, such as a recording track on a video recording disc. In the optical system of video reproduction with which the present invention is principally concerned, video information is stored on a disc in the form of raised bumps or lands on the disc surface, and is read by means of a light beam scanned across the surface. The bumps exhibit a lower total light reflectivity than the flat areas between the bumps. Moreover, since the scanning beam has a width comparable to the bump width, the reflectivity signal obtained when the beam is scanned over a series of the bumps is substantially sinusoidal in nature. Information is encoded on the disc by forming a large number of bumps in a spiral track on the disc surface, such that the resultant reflectivity signal has the form of a sinusoidal carrier, which may be frequency modulated with the video information.

Since most discs, especially those produced for consumer use, will have relatively large eccentricities, some means must be provided for maintaining the reading beam centered on the information track as closely as possible. When only a single reading beam is utilized both for obtaining information recorded on the track and for obtaining an error signal for centering the beam, accurate centering may not be possible, since the response characteristics of the track are such that a like error signal is produced on either side of the center.

As shown in FIG. 1, in a typical optical playback assembly a laser light source, indicated by reference numeral 10, directs light onto a disc surface 12. The reading beam from the laser is first reflected by a plane mirror 14, and then focused by a lens 16 onto a beam splitting prism 18, the transmitted portion of the beam, indicated at 20, then being directed through a quarter-wave plate 22, and then reflected from two successive fixed mirrors 24 and 26, and then from a movable mirror 28. The movable mirror is pivotally mounted as shown at 30, and is adjustable in angle by means of a transducer 32. Finally the beam is passed through an objective lens system 34 and focused onto the disc 12. A beam reflected from the disc follows essentially the same path back to the beam splitting prism 18, at which point the reflected beam is further reflected by the prism to a light detector 36.

The detector 36 is a photoelectric transducer from which an output signal is transmitted to video signal processing circuitry, as indicated at 40, and to a beam position servo mechanism, over line 42. Typically, the reading beam is made to follow the spiral track by translating the entire optical playback assembly radially across the disc at a constant speed, with corrections for eccentricity and other tracking errors being made by means of the mirror positioning transducer 32, in accordance with a control signal applied over line 44. The optical playback assembly may be supported at a constant distance above the disc by an air bearing, as indicated at 46.

The characteristics of the disc 12 are such that the reflectivity is maximum when the reading beam is positioned exactly between tracks, and is minimum when the reading beam is positioned over the center of the track. The response characteristic varies approximately sinusoidally in a radial direction, since the bump at the center of the track is less reflective than the wider flat area between tracks, and the width of the reading beam is comparable in size to the width of the bump. It will be appreciated, therefore, that the reflectivity signal, after low-pass filtering to remove carrier-frequency components due to bumps traversed along the direction of the track, will provide a signal indicative of the position of the reading beam with respect to the track centerline.

Figure 3A:
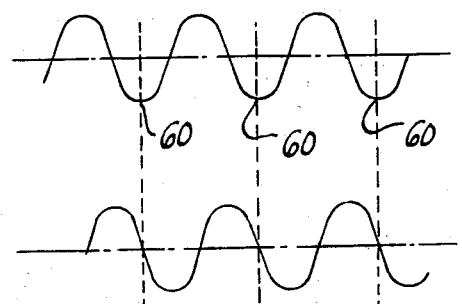
FIG. 3a is a graph showing the variation of an error signal derived from an information track, after low-pass filtering and phase compensation.

In accordance with the present invention, an acceleration signal of constant magnitude is applied to the beam positioning transducer 32 to accelerate the beam, and the polarity of the acceleration signal is reversed each time the reading beam crosses a switching line, which, in the illustrative embodiment, is the track centerline. The reading beam therefore oscillates from side to side across the track, and the error signal derived from the track is oscillatory in nature, and may be represented as an approximately sinusoidal signal, as shown in FIG. 3a. In fact, the error signal as first derived from the reflectivity signal will not have a zero dc component as shown in FIG. 3a but will be an oscillatory signal which is at all times positive.

Figure 2:
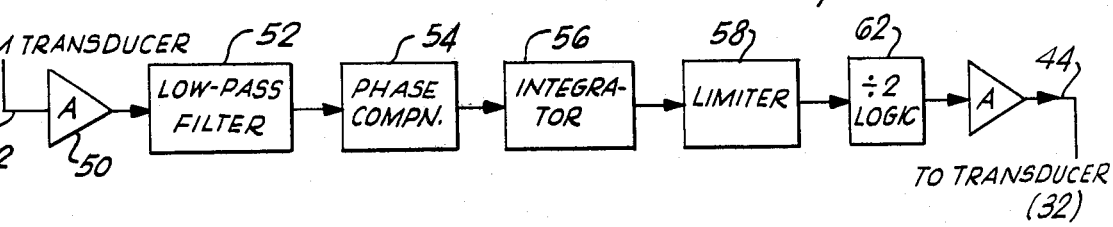
FIG. 2 is a block diagram of a digital beam position servo control system utilizing the principles of the present invention.
Figure 3B:
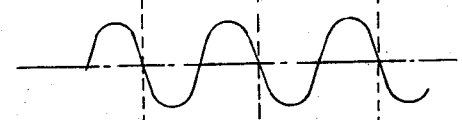
Figure 3C:
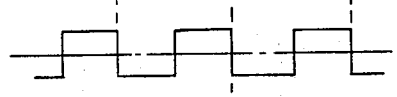
FIG. 3c is a graph showing the limited form of the integrated error signal of FIG. 3b.

As shown in FIG. 2, the signal derived from the transducer is processed by an amplifier 50, and then transmitted to a low-pass filter 52 to remove the carrier-frequency components. During one or more of these steps, the reflectivity signal is ac-coupled to remove any dc component, and consequently then appears substantially as shown in FIG. 3a. The filtered signal is next passed through a phase compensation circuit 54, the purpose of which will shortly become clear, and then transmitted to an integrator circuit 56, the output from which is substantially as shown in FIG. 3b, there being a ninety-degree phase shift with respect to the oscillatory signal shown in FIG. 3a. The integrated signal of FIG. 3b is next passed to a limiter circuit 58, the output from which is a square wave, as shown in FIG. 3c.

Figure 3D:
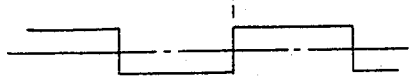
FIG. 3d is a graph showing an acceleration signal obtained after the limited signal of FIG. 3c is processed by the divide-by-two circuit included in FIG. 2.

It will be recalled that the track centerline positions correspond to the points of lowest reflectivity, i.e., the points indicated by reference numeral 60 in FIG. 3a. It will be apparent that these track centerline positions correspond to the falling edges of the square wave of FIG. 3c, and that these falling edges indicate the times at which the acceleration signal to be applied to the beam positioning transducer 32 must be reversed. The signal illustrated in FIG. 3c from the limiter 58 is next passed through a divide-by-two circuit 62 to obtain the signal shown in FIG. 3d, which signal is then amplified in amplifier 64, and transmitted over line 44 to the transducer. It will be apparent from FIG. 3d that the acceleration signal is positive when the reading beam is deflected to one side of the track centerline, and is negative when the reading beam is deflected to the other side of the track centerline, and that the acceleration signal is switched in polarity at times when the track centerline is traversed.

Since the transducers 32 and 36 inherently shift the phase of any applied or detected signal, and since other components, such as the low-pass filter 52, also introduce phase changes, the phase compensation circuit 54 is required to ensure that the applied correction signal will have the proper phase relationship with the movement of the reading beam. It will be understood by those of ordinary skill in the electronics and control systems arts that the frequency and maximum excursion of the oscillating reading beam will be determined by the physical parameters of the system, including the response characteristics of the disc and transducers, the loop gain of the system, and so forth. These parameters can be selected and adjusted to provide an oscillation frequency that is relatively high in comparison with the frequency of an error source, such as disc eccentricity, and to provide a relatively small maximum excursion from the track centerline.

It will be appreciated from the foregoing that the present invention represents a significant advance in center tracking servo systems, especially as applied to the field of video disc reproduction. In particular, the invention provides a simple and reliable digital technique for deriving an acceleration signal for application to a beam positioning transducer, to maintain it in oscillation as nearly as possible to the track centerline. It will also be appreciated that, although a specific embodiment of the invention has been described in detail for purposes of illustration, various modifications may be made without departing from the spirit and scope of the invention. Accordingly, the invention is not to be limited, except as by the appended claims.

I claim:

1. A digital servo control system for controlling the position of detection means with respect to the centerline of an information track without dithering the detection means, said system comprising:
   first transducer means for moving the detection means transversely with respect to the information track;
   second transducer means for deriving an information signal from the detection means;
   means for filtering the information signal to obtain an error signal indicative of the position of the detection means with respect to the track centerline;
   signal processing means, for processing the error signal to obtain a timing signal indicative of transitions of the detection means through a switching line parallel with the track; and
   control means, responsive to the timing signal, for controlling the polarity and duration of an acceleration signal applied to said first transducer means to accelerate the detection means toward a corrected position;
   whereby the detection means is accelerated in alternating directions and oscillates about the track centerline, solely under the influence of the acceleration signal applied to accelerate the detection means toward a corrected position.

2. A digital servo control system as set forth in claim 1, wherein:
   the switching line is coincident with the track centerline;
   the timing signal generated by said signal processing means changes state each time that the detection means crosses the centerline; and
   said control means reverses the polarity of the acceleration signal each time that the timing signal changes state, to keep the acceleration always directed toward the centerline.

3. A method for controlling the position of detection means with respect to the centerline of a longitudinal information track, without dithering the detection means, said method comprising the steps of:
   deriving an information signal from the detection means;
   filtering the information signal to obtain an error signal indicative of the position of the detection means with respect to the track centerline;
   processing the error signal to obtain a timing signal indicative of transitions of the detection means through a longitudinal switching line;
   generating an acceleration signal for application to the detection means;
   controlling the polarity and duration of the acceleration signal in accordance with the timing signal; and
   applying the resulting acceleration signal to the detection means, to move it in an oscillatory fashion about the track centerline.

4. A method as set forth in claim 3, wherein:
   the switching line is coincident with the track centerline;
   the timing signal obtained in said processing step changes state each time that the detection means crosses the centerline; and
   said controlling step includes reversing the polarity of the acceleration signal each time that the timing signal changes state, whereby the detection means is constantly accelerated toward, and oscillates about, the centerline.

5. A digital servo control system for controlling the position of a reading beam used to derive information from a spiral track on a recording disc, without dithering the reading beam, said system comprising:
   beam position transducer means, for moving the beam transversely with respect to the information track;
   detection transducer means, for deriving an information signal from the beam;
   means for filtering the information signal to obtain an error signal indicative of the beam position with respect to the track centerline;
   signal processing means, for processing the error signal to obtain a timing signal indicative of transitions of the beam through a longitudinal switching line along the information track; and
   control means, responsive to the timing signal, for controlling the polarity and duration of an acceleration signal applied to said beam position transducer means to accelerate the beam toward a corrected position, whereby the beam is accelerated in alternating directions and oscillates about the track centerline, solely under the influence of the acceleration signal applied to accelerate the beam toward a corrected position.

6. A digital servo control system as set forth in claim 5, wherein:
   the switching line is coincident with the track centerline;
   the timing signal produced by said signal processing means changes state each time that the beam crosses the centerline; and
   said control means reverses the polarity of the acceleration signal on each crossing of the centerline, and maintains a constant acceleration of the beam toward the centerline.

7. A digital servo control system as set forth in claim 6, wherein:
   the error signal is approximately sinusoidal, with peaks in one direction corresponding to the times of track centerline crossings; and
   said signal processing means includes means for shifting the error signal in phase by ninety degrees to obtain an intermediate signal that makes sign transitions at times corresponding to peaks in the error signal, and means for generating the timing signal from the intermediate signal, in such a manner that the timing signal has sign transitions only at times corresponding to the track centerline crossings.

8. A digital servo control system as set forth in claim 7, wherein said control means includes switching means for selecting the polarity of the acceleration signal as determined by the transitions in the timing signal.

* * * * *